US005096018A

United States Patent [19]

[11] Patent Number: 5,096,018

[45] Date of Patent: Mar. 17, 1992

Dickinson, Jr.

[54] METHOD AND APPARATUS FOR SECURING A MANBASKET TO A FORKLIFT

[75] Inventor: William C. Dickinson, Jr., Maitland, Fla.

[73] Assignee: Lifting Technologies, Inc., Missoula, Mont.

[21] Appl. No.: 657,098

[22] Filed: Feb. 14, 1991

[51] Int. Cl.[5] ........................... B60P 1/00; E04G 1/24

[52] U.S. Cl. ...................................... 182/63; 182/222; 108/51.1; 403/330; 24/498; 414/608; 414/785

[58] Field of Search .................. 182/63, 222; 403/409, 403/DIG. 8, 330; 414/608, 785; 108/51.1, 52.1; 24/498

[56] References Cited

U.S. PATENT DOCUMENTS

| | | | |
|---|---|---|---|
| 1,243,108 | 10/1917 | Richardson | 24/498 |
| 2,256,453 | 9/1941 | Bomar | 414/608 |
| 2,707,573 | 5/1955 | Balwics | 414/608 |
| 2,820,561 | 1/1958 | Meagher | 182/63 |
| 2,832,487 | 4/1958 | Oster | 108/51.1 |
| 3,003,806 | 10/1961 | Shramek | 294/101 |
| 3,016,973 | 1/1962 | Williamson | 182/63 |
| 3,101,128 | 8/1963 | Dane | 182/222 |
| 3,379,281 | 4/1968 | Calleti | 182/63 |
| 3,493,079 | 2/1970 | Dudschus | 182/63 |
| 3,493,137 | 2/1970 | Nilsen | 414/608 |
| 3,889,833 | 6/1975 | Thomas | 214/620 |
| 4,049,146 | 9/1977 | Decker | 214/620 |
| 4,515,506 | 5/1985 | Van Gompel | 108/51.1 |
| 4,747,610 | 5/1988 | Yingling | 414/785 |

OTHER PUBLICATIONS

Renfroe® Catalog Excerpt (4 pp.).
Miller, C., article published in *Wire Rope News & Sling Technology*, pp. 31-32 (Jun. 1990).

*Primary Examiner*—Reinaldo P. Machado
*Attorney, Agent, or Firm*—Klarquist, Sparkman, Campbell, Leigh and Whinston

[57] ABSTRACT

A method and apparatus are disclosed for securing a manbasket to the tines of a lifting fork of a forklift. A preferred embodiment comprises a tine clamp mounted to a tine socket on the manbasket. The clamp automatically applies a self-adjusting gripping force to the underside of the tine whenever the fork has elevated the manbasket and automatically releases the tine when the manbasket is resting upright on a reference surface. The tine clamp comprises a lever pivotably mounted at mid-length to the tine socket, at least one gripping cam rotatably mounted to one end of the lever, and a cam release member pivotably mounted to the opposite end of the lever. The lever is biased to keep the gripping edge surface of the cam in contact with the underside of the tine whenever the tine is in the socket and the manbasket is elevated. The cam has an outwardly spiraled profile to enable it to apply a gripping force to the tine that increases as the tine is urged more strongly out of the socket. The cam-release member contacts the reference surface when the manbasket is resting upright thereon, which causes the lever to pivot against the bias and draw the cam away from contact with the underside of tine, allowing the tine to be withdrawn from the socket.

54 Claims, 4 Drawing Sheets

METHOD AND APPARATUS FOR SECURING A MANBASKET TO A FORKLIFT

FIELD OF THE INVENTION

This invention relates to securing manbaskets, including personnel platforms, man-cages, and the like, to the tines of a lifting fork on a forklift vehicle so that said manbaskets can be safely elevated without falling off the lifting fork.

BACKGROUND OF THE INVENTION

The term "manbasket" as used herein encompasses various types of industrial personnel platforms, including man-cages and the like, used to elevate personnel and equipment to reach high, otherwise inaccessible locations. For safety reasons, a manbasket is typically at least partially enclosed circumferentially, and sometimes also overhead, to prevent personnel from falling off the platform.

Although manbaskets can be elevated using any of several types of lifting means, such as cranes and jacks, a convenient way to elevate a manbasket is by employing a forklift vehicle. Forklifts as generally known in the art are self-propelled vehicles having a lifting fork usually on the front end thereof which is used to lift goods-loaded pallets and other heavy or bulky items for transportation to remote locations or for movement from one elevation to another. A typical lifting fork has two outwardly projecting parallel tines. The lifting fork is mounted on a substantially vertical track, or "mast", on the vehicle. The mast is equipped with a winch or analogous mechanism used to raise or lower the fork relative to the vehicle.

To elevate a manbasket using a forklift, the tines of the lifting fork are typically placed beneath the platform portion of the manbasket, the platform serving as the "floor" of the manbasket. Some manbaskets are provided with grooves or channels beneath the platform to ensure that the tines are placed properly relative to the mass of the manbasket and to prevent the manbasket from sliding laterally off the tines.

Many forklifts are equipped with means for adjusting the forward and rearward tilt of the mast which, in turn, adjusts the tilt of the tines from horizontal. Adjusting the fork so that the tines are angled downward relative to horizontal can pose a substantial hazard to personnel in a manbasket supported by the fork in that the manbasket can slide in a forward direction off the fork. Even if the tines are not angled downward, it is possible for a manbasket to slip forward off the fork if a forward-moving forklift vehicle carrying the manbasket stops suddenly or the personnel in the manbasket cause the manbasket to shift position on the tines as a result of shifts of weight or exertions by the personnel therein. Sliding of the manbasket on the tines in a rearward direction does not pose as great a risk since such movement tends to place the manbasket more completely on the tines. Also, excessive rearward movement of the manbasket on the tines is usually obstructed by the mast and by various abutting plates or bars situated behind and above the tines.

Several methods and apparatuses are known in the art for securing large objects such as manbaskets and the like to the tines of a forklift. For example, U.S. Pat. No. 3,889,833 to Thomas discloses plural manually pivotable "square Z" latches provided on the manbasket for engaging the abutting plate of the forklift. A disadvantage of such latches is that they are usable only with a forklift having an abutting plate with the proper depth and located the proper distance above the tines. Also, such latches are biased by gravity to return to the latched position, which is not fail-safe. For example, if the latch journal fails to allow free rotation of the latch due to rust or incursion of dirt, the latch may not engage the abutting plate, particularly if one forgets to manually engage the latch. Another disadvantage is that the latches must be manually opened, which can be inconvenient.

U.S. Pat. No. 3,101,128 to Dane discloses a personnel platform provided with sets of parallel channels adapted for receiving the tines of the lifting fork therebetween. Each set of channels has an opening into which a tine is inserted. Each opening is partially obstructed with a vertical plate adapted to become situated behind the heel of the tine whenever the manbasket is lifted off the ground by the lifting fork. Unfortunately, providing such a feature requires that the manbasket rest in a tilted orientation on the ground to allow insertion of the tines. Also, the manbasket is provided with an inwardly tilting side panel to permit incursion of the forklift mast between two lateral sides of the manbasket. Hence, Dane discloses an elaborate mechanical interconnection between the tilting side panel and a pair of swingable legs which keep the manbasket in a tilted position on the ground. The fact that the manbasket must remain tilted on the ground is disadvantageous because workers are discomforted thereby. Also, the tilted floor can make it difficult to stabilize equipment and tools placed in the manbasket until the manbasket is elevated by the forklift. Also, proper placement of the manbasket on the tines requires appreciable manual intervention, including moving the tilted side panel into a vertical position after the manbasket has been lifted off the ground.

Another means known in the art for securing a manbasket to a lifting fork includes a chain passed around the mast and fastened to the manbasket. A disadvantage of this method is that it is easy to forget or ignore fastening the chain.

Another means known in the art is to fasten the manbasket to the tines using pins or screws or the like. This method has the disadvantage in that pins or screws must be manually engaged against the tines before elevating the manbasket and manually released when the manbasket is not in use. Also, screws are vulnerable to damage by the tines. For example, U.S. Pat. No. 4,049,146 to Decker discloses a screw mechanism which could be adapted for use with a manbasket.

Hence, there is a need for an apparatus and method for securing a manbasket to a lifting fork on a forklift vehicle, the apparatus and method characterized by automatic operation requiring no deliberate action by personnel to engage the securing means before the manbasket is elevated.

There is also a need for such an apparatus and method which reliably secure an elevated manbasket containing personnel and equipment to the tines of said lifting fork to prevent the manbasket from slipping forward off the tines.

There is also a need for such an apparatus and method which allow the floor of the manbasket to remain horizontal when the manbasket is resting upright on the ground.

There is also a need for such an apparatus and method wherein the tines of the lifting fork are automatically positioned properly relative to the manbasket for elevating the manbasket without causing a material imbalance in the resulting load supported by the tines.

There is also a need for such an apparatus and method that automatically disengage the tines from the manbasket whenever the manbasket is resting in an upright position on the ground or other reference surface.

There is also a need for such an apparatus and method that can be used to secure a manbasket to forks of different makes and models of forklift vehicles without the need for intervening adaptive action.

SUMMARY OF THE INVENTION

It is, therefore, an object of the present invention to provide an apparatus and method for automatically securing a manbasket to a lifting fork on a forklift vehicle whenever the lifting fork has elevated the manbasket off the ground or other reference surface.

More particularly, an object of the present invention is to provide such an apparatus and method wherein an elevated manbasket is automatically prevented from slipping forwardly off the tines of the lifting fork.

Another object of the present invention is to provide such an apparatus and method wherein the manbasket is secured to the fork only when the manbasket is elevated off the reference surface, thereby allowing a forklift operator to conveniently manipulate the tines into the proper orientation relative to the manbasket before elevating the manbasket.

Another object of the present invention is to provide such an apparatus and method wherein the tines are automatically disengaged from the manbasket whenever the manbasket is resting in an upright position on the ground or other reference surface, thereby allowing the forklift to be conveniently driven away from the manbasket and used for other work.

Another object of the present invention is to provide such an apparatus and method enabling the manbasket to be secured to the fork of virtually any type of forklift and to tines of varying thicknesses.

Another object of the present invention is to provide such an apparatus and method wherein the force by which the manbasket is secured to the tines is self-adjusting.

Briefly, these and other objects of the present invention that will become hereinafter apparent are accomplished in accordance with the present invention wherein an apparatus and method are provided for securing a manbasket to a lifting fork of a forklift vehicle. A preferred embodiment of the apparatus comprises a tine clamp provided on the proximal end of a tine socket provided preferably beneath the floor of the manbasket. Preferably, a tine clamp is provided for each tine of the lifting fork.

The tine clamp is adapted to automatically apply a self-adjusting gripping force to the under-surface of a tine whenever the fork has elevated the manbasket off the reference surface. Whenever the manbasket is resting upright on the reference surface, the tine clamp automatically releases the tine, allowing the tine to be removed from the tine socket.

Each tine clamp comprises a lever, a gripping cam, bias means, and a cam-release member. The lever has a mid-portion mounted to the tine socket in a manner allowing pivoting motion of a first lever end toward and away from the under-surface of the tine. The first lever end has rotatably mounted thereto at least one gripping cam having an edge surface defining an outwardly radiating spiral. The cam projects into the tine socket so as to allow the edge surface thereof to grippingly engage the under-surface of the tine whenever the tine is in the socket and the manbasket has been elevated off the reference surface. Whenever the manbasket is so elevated and the tine is being urged out of the socket, the cam is urged to rotate relative to the lever in a manner causing the cam edge surface to apply a gripping force of increasing magnitude against the under-surface of the tine. The tine clamp includes bias means adapted to apply a pivot force to the lever sufficient to keep the cam edge surface in gripping contact with the under-surface of the tine whenever the manbasket is elevated off the reference surface.

The lever also includes a second lever end to which is pivotably mounted a cam-release member adapted to contact the reference surface whenever the manbasket is resting upright on said surface. Whenever the manbasket is resting upright on the reference surface, a portion of the weight of the manbasket is borne by the cam-release member, which causes the lever to pivot against the pivot force applied by said bias means sufficiently to draw the cam edge surface away from gripping contact with the under-surface of the tine, thereby allowing the tine to be removed from the socket.

Either one or several cams can be mounted to the first lever end. Also, said bias means can comprise any of several types of springs such as torsion springs, extension springs, and compression springs. Such springs can be used singly or as a set comprising multiple springs, such as a spring situated on each side of the lever.

The cam-release member is preferably configured as a shoe having a first end pivotably mounted to the second lever end and a second end terminating in a sole plate adapted to contact the reference surface whenever the manbasket is resting upright on said surface.

DETAILED DESCRIPTION

Figure 1:
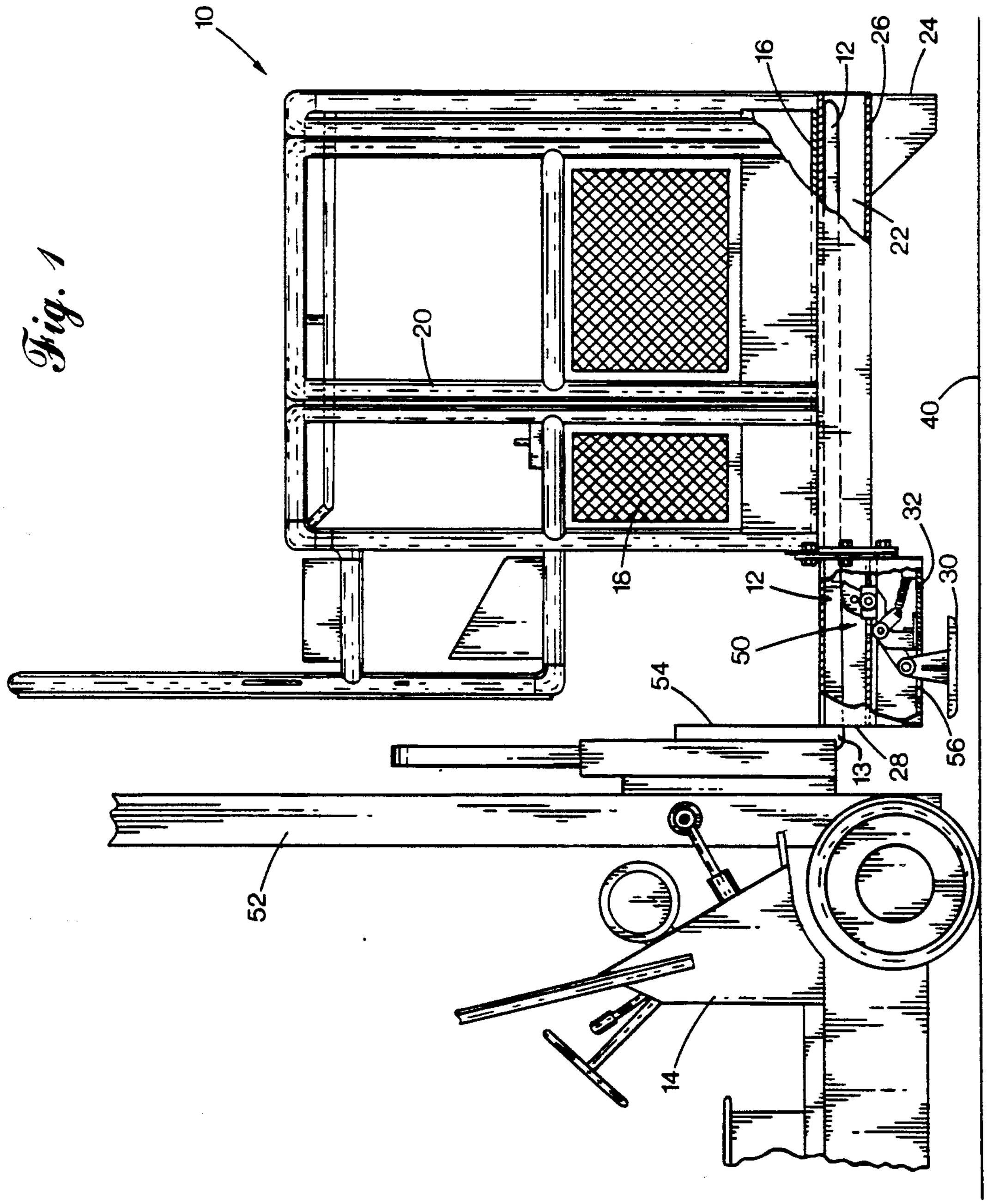
FIG. 1 is a side elevational view of a manbasket supported on the tines of a lifting fork and secured to the tines by a tine clamp according to the present invention.

Referring to FIG. 1, a manbasket 10 according to the present invention is shown positioned on the tines 12 of an elevated lifting fork 13 of a forklift vehicle 14. (Conventional lifting forks 13 typically have two parallel tines 12. A second tine not shown in the side elevational view of FIG. 1 is situated similarly to the obverse tine shown, but beneath the opposite side of the manbasket.) The manbasket 10 typically comprises a personnel platform or floor 16, plural vertical side panels 18 mounted perimetrically to the floor, and a door 20 to allow passage of personnel and equipment into and out of the manbasket 10.

The manbasket 10 preferably includes a separate tine socket 22 for each tine 12 of the lifting fork 13. (Only an obverse tine socket 22 is shown in FIG. 1. A second tine socket, parallel to the obverse tine socket shown, is provided beneath the opposite side of the manbasket.)

As shown in the FIG. 1 embodiment, the tine sockets 22 are preferably provided under the floor 16 in a bilaterally symmetrical manner. However, the sockets 22 can be provided in any convenient location on the manbasket 10, including along opposing side panels or even overhead.

In FIG. 1, a foot pad 24 is provided near the distal end 76 of each tine socket 22. At or near the proximal end 28 of each tine socket is provided a shoe 30 suspended from a housing 32 described in further detail hereinbelow. The combination of the shoes 30 and foot pads 24 keeps the floor 16 horizontal whenever the manbasket is resting upright on the ground or other reference surface 40.

As used herein, a "reference surface" 40 is the ground or any other surface on which the manbasket 10 can rest upright, generally for the purpose of loading or unloading personnel or equipment. The reference surface 40 need not be the same surface on which the forklift vehicle 14 is resting.

The tine sockets 22 guide the forklift operator in positioning the tines 12 properly for elevating the manbasket 10 so as to yield a substantially balanced load on the lifting fork 13. The tine sockets 22 also help prevent the manbasket 10 when elevated by the lifting fork 13 from sliding transversely off the tines 12. In addition, whenever the manbasket 10 of FIG. 1 is resting upright on the reference surface 40, the tine sockets 22 create a gap between the manbasket floor 16 and the reference surface 40 which enables the forklift operator to easily interpose the tines between the manbasket floor 16 and the reference surface 40 for the purpose of elevating the manbasket 10.

At least one tine socket 22 is also provided with an automatic tine clamp 50 according to the present invention, described in detail hereinbelow. The tine clamp 50 is termed "automatic" because the only activity necessary to cause it to grippingly engage a corresponding tine 12 is insertion of the tine 12 into the corresponding tine socket 22 and raising the lifting fork 13 sufficiently to elevate the manbasket 10 off the reference surface 40. The term "automatic" also denotes that the tine clamp 50 automatically disengages from the tine 12 whenever the manbasket 10 is resting upright on a reference surface 40, thereby allowing the tines to be freely inserted into or removed from the tine sockets.

Whenever the lifting fork 13 has elevated the manbasket 10 off the reference surface 40, the tine clamp 50 grippingly engages the tine 12. The tine clamp 50 thereby prevents the manbasket 10 from sliding in a forward direction (away from the forklift mast 52) off the lifting fork 13 but permits the manbasket 10 to be moved rearward (toward the mast 52) further onto the lifting fork 13. Movement of the manbasket 10 toward the mast 52 is permitted because each of the tines 12 typically has a vertical portion 54 which obstructs excessive rearward movement of the manbasket 10 off the lifting fork 13. Hence, the tine clamp 50 prevents the corresponding tine 12 from being removed from the tine socket 22, but not necessarily from being moved further into the tine socket 22, whenever the lifting fork 13 has elevated the manbasket 10 off the reference surface 40. As shown in FIG. 1, the tine clamp 50 is preferably located inside a protective housing 32. The shoe 30, which comprises a portion of the tine clamp 50, suspends through an opening 56 in the underside of the housing 32.

The tine clamp 50 is preferably located at or near the proximal end 28 of the tine socket 22 to ensure that the tine 12 is gripped by the tine clamp 50 even when the tine 12 is inserted only part way into the tine socket 22.

For optimal safety, a manbasket 10 preferably is provided with a tine clamp 50 for each tine 12 of the lifting fork !3. Virtually all lifting forks 13 have two tines 12; therefore, the manbasket 10 preferably has a corresponding first tine clamp 50 provided in association with a first tine socket 22 and a second tine clamp (not shown) provided in association with a second tine socket (not shown).

Figure 2:
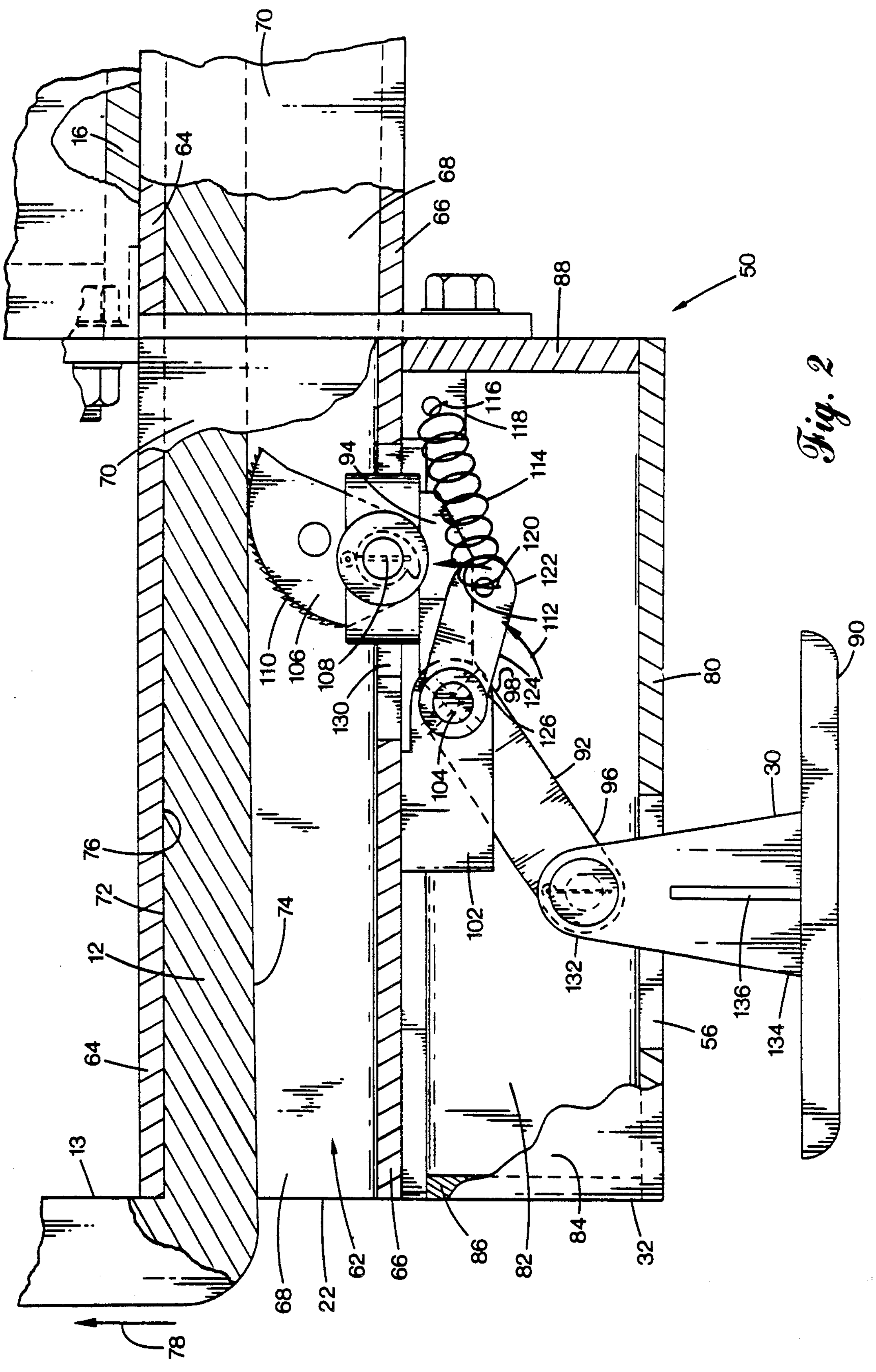
FIG. 2 is a side, partially cutaway, elevational view of one embodiment of a tine clamp.

A tine clamp 50 is detailed in the side elevational view of FIG. 2, showing a first preferred embodiment thereof with a portion of the housing and tine socket cut away for clarity. In FIG. 2, items similar to those shown in FIG. 1 are assigned identical reference designators. Shown are the manbasket floor 16, the longitudinally extended tine socket 22 provided beneath the manbasket floor 16 and adapted to receive a tine 12. The tine socket 22 includes a socket space 62 defined in part by a first socket wall 64 and a second socket wall 66. The tine socket 22 preferably also includes a first side wall 68 and a second side wall 70 (a portion of which is shown cut away for clarity) for increased lateral stability of a manbasket when elevated by the tines. Each tine 12 has an upward facing lifting surface 72 and an opposing under-surface 74. The first socket wall 64 has an interior surface 76 adapted to contact the lifting surface 72 of the tine 12 whenever the tine 12 is inserted, as shown, into the socket space 62 and the lifting fork 13 is applying a net elevating force (arrow 78) to the manbasket in an upright orientation. Also shown are the protective housing 32 comprised of a bottom panel 80, side panels 82, 84, and end panels 86, 88. The bottom panel 80 defines an opening 56 through which suspends the shoe 30.

The shoe 30 has a sole plate 90 adapted to contact the reference surface whenever the manbasket is resting in an upright orientation upon the reference surface.

Referring further to FIG. 2, the tine clamp 50 also comprises a lever 92 having a first end 94, an opposing second end 96, and a mid-portion 98 situated between the first and second ends. The mid-portion 98 is mounted to the second socket wall 66 by a yoke 102 or analogous means which allows at least limited pivoting motion of the first end 94 of the lever 92 toward and away from the first socket wall 64 about a pivot axis oriented transversely to the tine 12. (The pivot axis is represented by a pin 104 rigidly affixed transversely to the mid-portion 98 of the lever 92 and journaled in the yoke 102.) At least one gripping cam 106 is mounted to the first end 94 of the lever 92 so as to permit at least limited rotation of the cam 106 relative to the lever 92 about a rotational axis oriented parallel to the pivot axis 104. (The rotational axis is represented by a pin 108 passing transversely through the both the cam 106 and the first end 94 of the lever 92.)

The cam 106 has an edge surface 110 defining at least a portion of an outwardly radiating spiral relative to the rotational axis 108. To facilitate gripping the under-surface 74 of the tine 12, the edge surface 110 of the cam 106 is preferably toothed or deeply khurled.

The tine clamp 50 further comprises bias means coupled to the lever 92 for applying a pivoting force or torque (arrows 112) to the lever 92 sufficient to maintain the edge surface 110 of the cam 106 in contact with the under-surface 74 of the tine 12 whenever the tine 12 is inserted into the socket 22 and the manbasket is elevated off the reference surface.

As shown in FIG. 2, one embodiment of said bias means comprises at least one extension spring 114 having a first end 116 coupled to a tie point 118 mounted to the second socket wall 66 and a second end 120 coupled to one end 122 of a pivot arm 142. The other end 126 of the pivot arm 124 is affixed to the lever pivot axis 104. Preferably, there are two such extension springs, one situated on the obverse side of the lever 92 shown in FIG. 2, and the other (not shown) situated on the reverse side of the lever 92.

An alternative embodiment (not shown) of said bias means includes at least one torsion spring oriented coaxially with the rotational axis 108. Such a torsion spring would typically have a first end engaged against the lever 92 and a second end engaged against the yoke 102 so as to apply a torque to the lever about the rotational axis in a manner similar to the torque applied by the extension spring 114. Preferably, there would be two such torsion springs, one located on each side of the lever 92.

Another alternative embodiment (not shown) of said bias means comprises a compression spring interposed between the underside of the first end 94 of the lever 92 and the bottom panel 80 of the housing 32. Other alternative embodiments of said bias means are possible in accordance with generally accepted principles of machine design.

The cam 106 extends into the socket space 62 through an opening 130 defined by the second socket wall 66. The cam 106 projects toward the interior surface 72 of the first socket wall 64 such that the edge surface 110 of the cam 106 contacts the under-surface 74 of the tine 12 whenever the tine 12 has been inserted into the socket 22 and the lifting fork 13 has elevated the manbasket off the reference surface. Whenever the manbasket is elevated off the reference surface and the tine 12 is being urged out of the socket 22, the cam 106 is caused to turn about its rotational axis 108 as a result of the edge surface 110 of the cam 106 frictionally contacting the under-surface 74 of the outwardly moving tine 12. As the cam 106 turns in such a manner, the effective diameter of the cam 106 between the under-surface 74 of the tine 12 and the rotational axis 108 is urged to increase as a result of the outwardly radiating spiraled profile of the cam 106. As a result, the edge surface 110 of the cam 106 applies a gripping force of ever-increasing magnitude to the under-surface 74 of the tine 12 being urged out of the socket 22. Hence, the gripping force applied by the cam 106 self-adjusts to increase whenever the tine 12 is being urged more strongly out of the socket 22. Such a gripping force is required, for example, whenever an elevated manbasket is supported by tines that are angled downward from the horizontal and the manbasket is beginning to slip forwardly off the tines.

Referring further to FIG. 2, the tine clamp 50 also comprises a cam-release member preferably embodied in a vertically suspended shoe 30 having a first end 132 and a second end 134. The first end 132 is pivotally coupled to the second end 96 of the lever 92 to allow the second end 134 of the shoe 30 to extend under the influence of gravity toward the reference surface (reference surface not shown). The second end 134 of the shoe 30 is preferably provided with a sole plate 90 rigidly affixed thereto and reinforced by gussets 136. The sole plate 90 is adapted for contacting the reference surface whenever the manbasket is resting upright on the reference surface. Whenever the manbasket is elevated off the reference surface, the shoe 30 remains suspended from the second end 96 of the lever 92. Whenever the manbasket is resting upright on the reference surface, a portion of the weight of the manbasket and any contents thereof is supported by the shoe 30. Such weighted contact of the shoe 30 with the reference surface causes a net upward force to be applied against the second end 96 of the lever 92, the force causing the lever 92 to pivot about the pivot axis 104 sufficiently against the force applied by said bias means to draw the cam edge surface 110 away from gripping contact with the under-surface 74 of the tine 12, thereby allowing the tine 12 to be removed from the socket 22.

As can be surmised, said bias means must be capable of applying a strong pivoting force. However, said pivoting force must not be too strong. When the manbasket is resting upright on a reference surface, the weight of the manbasket borne by the shoe 30 must be sufficient to pivot the second end 96 of the lever 92 upward (and the first end 94 downward) against the force imparted by said bias means sufficiently to draw the cam edge surface 110 away from gripping contact with the under-surface 74 of the tine 12. As a representative example, not intended to be limiting, an extension spring 114 that has been found to be satisfactory when employed as a pair of springs, one on each side of the lever 92, has a wire diameter of 0.148 inches, an outside coil diameter of 0.938 inches, a free length of 4.190 inches, an initial tension of 45 Lb.ft/in, and a spring rate of 90.2 Lb.ft/in.

Figure 3:
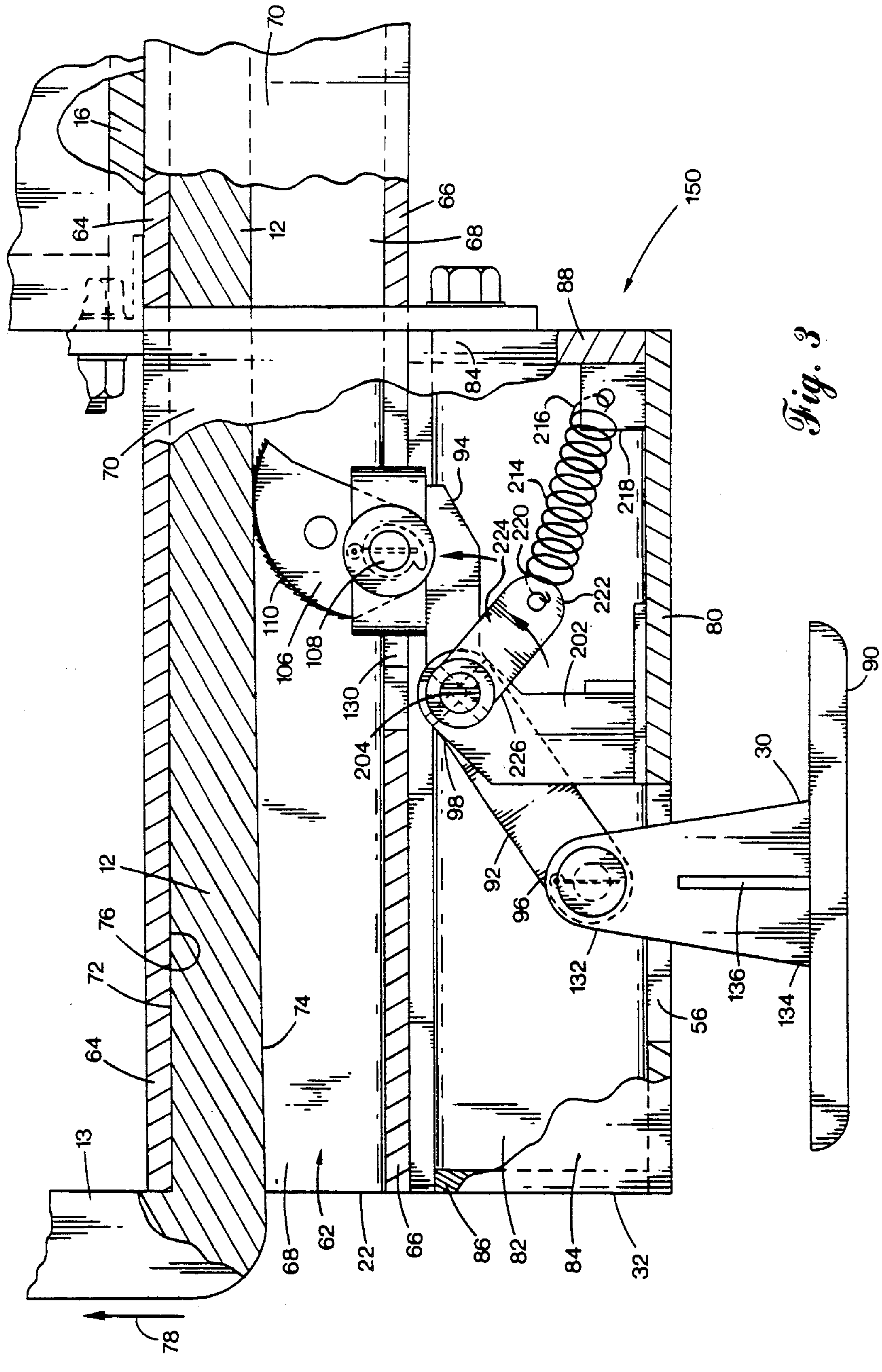
FIG. 3 is a side, partially cutaway, elevational view of the tine clamp shown in FIG. 1.

Another embodiment of the tine clamp 150 is illustrated in FIG. 3 wherein elements identical to those shown in the FIG. 2 embodiment are assigned identical reference designators and are not described further hereinbelow. The difference in the FIG. 2 and FIG. 3 embodiments resides principally in the manner in which the lever 92 is pivotably mounted. In FIG. 2, the lever 92 is mounted via the yoke 102 directly to the second socket wall 66. In FIG. 3, the lever 92 is mounted via a yoke 202 to the housing bottom panel 80.

As disclosed herein, pivotably mounting the lever 92 as in FIG. 3 to the housing bottom panel 80 is still regarded as "mounting the lever to the second socket wall," albeit indirectly. This manner of description is used herein to distinguish that the lever 92 is preferably not mounted to the first socket wall 64. Mounting the lever 92 to the first socket wall 64 would generally pose an obstruction to insertion of the tine 12 into the socket 22 or render the cam 106 incapable of applying a sufficiently strong gripping force against the under-surface 74 of the tine 12. In accordance with generally recognized machine design principles known in the art, the lever 92 can be pivotably mounted to the second socket wall 66, the first and second side walls 68, 70 of the socket, the housing bottom panel 80, or the side panels 82, 84 of the housing and still be capable of performing its intended function. Mounting the lever 92 in any of these locations other than the first socket wall 64 is functionally equivalent and therefore synonymous with mounting the lever 92 to the second socket wall 66.

Also shown in the FIG. 3 embodiment are a pivot pin 204 serving as the pivot axis of the lever 92; at least one gripping cam 106 similar to that shown in FIG. 2 mounted to the first end 94 of the lever 92 so as to permit at least limited rotation of the cam 106 relative to the lever 92 about the rotational axis 108; and bias means comprising at least one extension spring 214 having a first end 216 coupled to a fixed tie point 218, and a second end 220 coupled to one end 222 of a pivot arm 224. The other end 226 of the pivot arm 224 is affixed to the pivot pin 204. Preferably, there are two such extension springs, one located on the obverse side of the lever 92 as shown in FIG. 3, and another spring (not shown) located on the reverse side of the lever 92. As discussed hereinabove with respect to the FIG. 2 embodiment, said bias means can also have any of a number of other possible configurations, including at least one torsion spring or compression spring.

The FIG. 3 embodiment also comprises a cam-release member preferably comprising a shoe 30 having a first end 132 pivotably coupled to the second end 96 of the lever 92 and a second end 134 preferably having a sole plate 90 reinforced by gussets 136.

Figure 4:
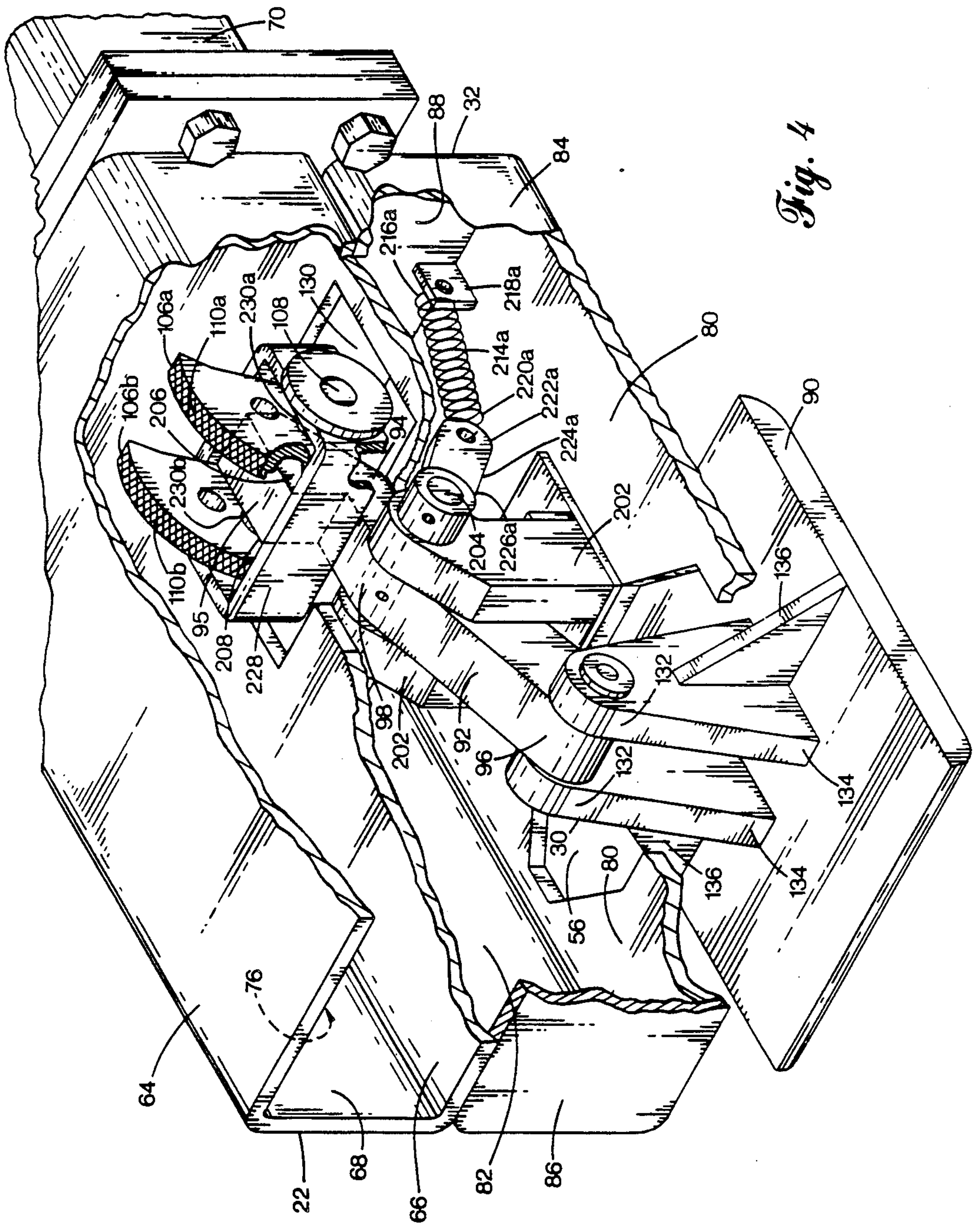
FIG. 4 is an isometric, partially cutaway, view of the FIG. 3 embodiment.

FIG. 4 is an isometric view of the FIG. 3 embodiment comprising first and second gripping cams **106*a* and 106*b*. FIG. 4 also shows the bottom panel 80 of the housing 32, the yoke 202 mounted to the bottom panel 80, the mid-portion 98 of the lever 92 pivotably mounted to the yoke 202 by a transverse pin 104, and the shoe 30 pivotably mounted to the second end 96 of the lever 92. The shoe 30 comprises first ends 132 preferably configured as a yoke, reinforcing gussets 136, and a sole plate 90 affixed to the second ends 134. The shoe 30 suspends downward through an opening 56 defined in the bottom panel 80 of the housing 32. The cams 106*a*, 106*b* rotatably mounted to the first end 94 of the lever 92 project upward through an opening 130 defined in the second wall 66 of the tine socket 22**.

The first end 94 of the lever has an upwardly projecting portion 95, a first lateral surface 206, and an opposing second lateral surface 208. The pin 108 extends transversely through the upwardly projecting portion 95, thereby projecting from both the first lateral surface 206 and the second lateral surface 208. The pin 108 serves as a rotational axis for the cams **106*a*, 106*b*. I.e., the first gripping cam 106*a* is rotatably mounted via the pin 108 to the first lateral surface 206 and the second gripping cam 106*b* is rotatably mounted via the pin 108 to the second lateral surface 208. Thus, the first and second gripping cams 106*a*, 106*b* are coaxially mounted in the same orientation to the lever 92**.

The pin 108 is further supported by a reinforcing ring 228 affixed symmetrically to the upwardly projecting portion 95 of the lever 92. For maximal lateral stability, each cam **106*a*, 106*b* has rigidly affixed to each side thereof a hub 230*a*, 230*b* through which extends the pin 108**.

The FIG. 4 embodiment preferably includes a pair of extension springs **214*a*, 214*b*, one situated on each lateral side of the yoke 202. (Only one spring, item 214*a*, is shown. The second spring, item 214*b*, which is obscured by foreground detail, is located on the opposing lateral side of the yoke 202 from spring 214*a*.) Spring 214*a* has a first end 216*a* coupled to a tie point 218*a* and a second end 220*a* coupled to one end 222*a* of a pivot arm 224*a*. Second spring 214*b* is secured in a similar manner to a separate tie point 218*b* (not shown) and a separate pivot arm 224*b* (not shown). An opposing end 226*a* of pivot arm 224*a* is affixed to the lever axle pin 204. An opposing end 226*b* (not shown) of pivot arm 224*b* (not shown) is similarly affixed to the lever axle pin 204 on the opposite side of the lever. The lever axle pin 204 is journaled in the yoke 202 and rigidly affixed transversely to the mid-portion 98 of the lever 92**

Although the FIG. 4 embodiment is shown having two gripping cams, alternative embodiments (not shown) having only one or greater than two cams are also possible. For example, the first end 94 of the lever 92 could be configured as a bilaterally symmetrical yoke with a single cam mounted between the arms of the yoke and extending upward in a manner similar to the cams of FIG. 4. It is also possible to have more than two cams mounted to the lever in a manner similar to the embodiments disclosed herein for mounting one or two cams.

Multiple cams have an advantage in that they can apply a greater gripping power against the under-surface of a tine than a single cam. However, it is possible to have too many cams or cams that collectively have too great a surface area in contact with the under-surface of the tine to achieve a sufficient "bite" into the under-surface. Hence, the preferred configuration is as shown in FIG. 4 having two cams.

Having illustrated and described the principles of the invention in several preferred and alternative embodiments, it should be apparent to those skilled in the art that the invention can be modified in arrangement and detail without departing from such principles. I claim all modifications coming within the spirit and scope of the following claims.

I claim:

1. An apparatus for securing a manbasket to a tine of a lifting fork on a forklift vehicle whenever the lifting fork has elevated the manbasket off a reference surface, where the tine has a lifting surface and an opposing under-surface, and the manbasket includes a tine socket adapted to receive the tine inserted into the socket for the purpose of elevating the manbasket, the socket including a socket space defined in part by a first socket wall having an interior surface adapted to contact the lifting surface of the tine whenever the tine is inserted into the socket and the lifting fork is applying a net elevating force to the manbasket, and an opposing second socket wall, the apparatus comprising:

a lever having a first end, an opposing second end, and a mid-portion between the first and second ends, the mid-portion pivotably mounted to the second socket wall via a pivot axis oriented transversely to the socket and the lever so as to allow the first end of the lever to be moved toward and away from the first socket wall;

a gripping cam mounted to the first end of the lever so as to permit at least limited rotation of the cam relative to the lever about a rotational axis oriented parallel to the pivot axis, the cam having an edge surface defining at least a portion of an outwardly radiating spiral relative to the rotational axis and adapted for gripping the under-surface of the tine, the cam projecting into the socket space toward the interior surface of the first socket wall such that the edge surface of the cam contacts the under-surface of the tine whenever the tine has been inserted into the socket and the lifting fork has elevated the manbasket off the reference surface, and the cam rotatable about the rotational axis so to apply a gripping force against the under-surface of the tine whenever the manbasket is elevated off the reference surface and the tine is being urged out of the socket, the gripping force increasing in magnitude as the tine is urged more strongly out of the socket so as to prevent the tine from being removed from the socket;

bias means coupled to the lever for applying a pivot force to the lever about the pivot axis sufficient to maintain the edge surface of the cam in contact with the under-surface of the tine whenever the tine is inserted into the socket and the manbasket is elevated off the reference surface; and a cam-release member having a first end pivotably coupled to the second end of the lever and a second end extending toward the reference surface so as to contact the reference surface whenever the manbasket is resting upright on the reference surface but not when the manbasket is elevated off the reference surface, such contact of the cam-release member with the reference surface serving to cause the cam-release member to pivot the lever about the pivot axis sufficiently against the pivot force applied by said bias means to draw the cam edge surface away from gripping contact with the under-surface of the tine, thereby allowing the tine to be removed from the socket.

2. An apparatus for securing a manbasket as recited in claim 1 wherein the first end of the lever has rotatably mounted thereto plural gripping cams.

3. An apparatus for securing a manbasket as recited in claim 2 wherein the first end of the lever has a first lateral surface and an opposing second lateral surface and wherein a first gripping cam is rotatably mounted to the first lateral surface and a second gripping cam is rotatably mounted to the second lateral surface coaxially with the first gripping cam.

4. An apparatus for securing a manbasket as recited in claim 1 wherein said bias means comprises an extension spring having a first end coupled to the second socket wall and a second end coupled to the lever.

5. An apparatus for securing a manbasket as recited in claim 4 further comprising a pivot arm having a first end affixed to the pivot axis of the lever and a second end coupled to the second end of the extension spring.

6. An apparatus for securing a manbasket as recited in claim 1 wherein the cam-release member comprises a shoe pivotably mounted to the second end of the lever, the shoe having a sole plate adapted to contact the reference surface whenever the manbasket is resting upright on the reference surface.

7. An apparatus for securing a manbasket to a tine of a lifting fork on a forklift vehicle whenever the lifting fork has lifted the manbasket off a reference surface, where the tine has a lifting surface and an opposing under-surface, the apparatus comprising:

a tine socket provided on the manbasket, the socket adapted to receive the tine inserted into the socket for the purpose of lifting the manbasket, the socket including a socket space defined in part by a first socket wall having an interior surface adapted to contact the lifting surface of the tine whenever the tine is inserted into the socket and the lifting fork is applying a net elevating force to the manbasket, and an opposing second socket wall;

a lever having a first end, an opposing second end, and a mid-portion between the first and second ends, the mid-portion pivotably mounted to the second socket wall via a pivot axis oriented transversely to the socket and the lever so as to allow the first end of the lever to be moved toward and away from the first socket wall;

a gripping cam mounted to the first end of the lever so as to permit at least limited rotation of the cam relative to the lever about a rotational axis oriented parallel to the pivot axis, the cam having an edge surface defining at least a portion of an outwardly radiating spiral relative to the rotational axis and adapted for gripping the under-surface of the tine, the cam projecting into the socket space toward the interior surface of the first socket wall such that the edge surface of the cam contacts the under-surface of the tine whenever the tine has been inserted into the socket and the lifting fork has lifted the manbasket off the reference surface, and the cam rotatable about the rotational axis so to apply a gripping force against the under-surface of the tine whenever the manbasket is lifted off the reference surface and the tine is being urged out of the socket, the gripping force increasing in magnitude as the tine is urged more strongly out of the socket so as to prevent the tine from being removed from the socket;

bias means coupled to the lever for applying a pivot force to the lever about the pivot axis sufficient to maintain the edge surface of the cam in contact with the under-surface of the tine whenever the tine is inserted into the socket and the manbasket is elevated off the reference surface; and a cam-release member having a first end pivotably coupled to the second end of the lever and a second end extending toward the reference surface so as to contact the reference surface whenever the manbasket is resting upright on the reference surface but not when the manbasket is elevated off the reference surface, such contact of the cam-release member with the reference surface serving to cause the cam-release member to pivot the lever about the pivot axis sufficiently against the pivot force applied by said bias means to draw the cam edge surface away from gripping contact with the under-surface of the tine, thereby allowing the tine to be removed from the socket.

8. An apparatus for securing a manbasket as recited in claim 7 wherein the cam-release member comprises a shoe pivotably mounted to the second end of the lever, the shoe having a sole plate adapted to contact the reference surface whenever the manbasket is resting in an upright orientation on the reference surface.

9. An apparatus for securing a manbasket as recited in claim 7 further comprising multiple tine sockets mounted to the manbasket, one socket for each tine of the lifting fork.

10. An apparatus for securing a manbasket as recited in claim 9 wherein the manbasket has an underside to which a first tine socket and a second tine socket are mounted.

11. A manbasket adapted to be releasably attached to tines of a lifting fork on a forklift vehicle, where each tine has a lifting surface and an opposing under-surface, the manbasket comprising:

a personnel-supporting platform having an upper surface and a bottom surface;

multiple tine sockets provided on the bottom surface of the platform, one socket for each corresponding tine of the lifting fork, where each tine socket is adapted to receive the corresponding tine when said tine is inserted into the socket for the purpose of elevating the manbasket, each tine socket including a socket space defined in part by a first socket wall having an interior surface adapted to contact the lifting surface of the tine whenever said tine is inserted into the socket and the lifting fork is applying a net lifting force to the manbasket, and an opposing second socket wall, each tine socket including (a) a lever having a first end, an opposing second end, and a middle portion situated between the first and second ends, the middle portion pivotably mounted to the second socket wall via a pivot axis oriented transversely to the socket and the lever so as to allow the first end of the lever to be moved toward and away from the first socket wall;

(b) a gripping cam mounted to the first end of the lever so as to permit at least limited rotation of the cam relative to the lever about a rotational axis oriented parallel to the pivot axis, the cam having an edge surface defining at least a portion of an outwardly radiating spiral relative to the rotational axis and adapted for gripping the under-surface of the corresponding tine, the cam projecting into the socket space toward the interior surface of the first socket wall such that the edge surface of the cam contacts the under-surface of said tine whenever the tine has been inserted into the socket and the lifting fork has elevated the manbasket off the reference surface, and the cam rotatable about the rotational axis so as to apply a gripping force against the under-surface of the tine whenever the manbasket is elevated off the reference surface and the tine is being urged out of the socket, the gripping force increasing in magnitude as the tine is urged more strongly out of the socket so as to prevent the tine from being removed from the socket;

(c) bias means coupled to the lever for applying a pivot force to the lever about the pivot axis sufficient to maintain the edge surface of the cam in contact with the under-surface of the tine whenever the tine is inserted into the socket and the manbasket is elevated off the reference surface; and (d) a cam-release member having a first end pivotably coupled to the second end of the lever and a second end extending toward the reference surface so as to contact the reference surface whenever the manbasket is resting upright on the reference surface but not when the manbasket is elevated off the reference surface, such contact of the cam-release member with the reference surface serving to cause the cam-release member to pivot the lever about the pivot axis sufficiently against the pivot force applied by said bias means to draw the cam edge surface away from gripping contact with the under-surface of the tine, thereby allowing the tine to be removed from the socket.

12. An apparatus for securing a manbasket to tines of a lifting fork on a forklift vehicle whenever the lifting fork has elevated the manbasket off a reference surface, where the manbasket has a personnel-supporting surface and a bottom surface, and each tine has a lifting surface and an opposing under-surface, the apparatus comprising:

multiple tine sockets provided on the bottom surface of the manbasket, the sockets adapted to simultaneously receive a corresponding tine of the lifting fork for the purpose of elevating the manbasket, each socket including a socket space defined in part by a first socket wall having an interior surface adapted to contact the lifting surface of the corresponding tine whenever the tine is inserted into the socket and the lifting fork is applying a net lifting force to the manbasket, and an opposing second socket wall, each tine socket including (a) a yoke mounted to the second socket wall;

(b) a lever having a first end, an opposing second end, a mid-portion situated between the first and second ends, a first lateral surface, and a second lateral surface opposite the first lateral surface, the mid-portion mounted to the yoke in a manner whereby the lever can be pivoted about a pivot axis oriented transversely to the socket and the lever so as to allow the first end of the lever to be moved toward and away from the first socket wall;

(c) first and second gripping cams mounted to the first end of the lever about a rotational axis oriented parallel to the pivot axis, where the first gripping cam is mounted to the first lateral surface and the second gripping cam is mounted to the second lateral surface of the lever in an orientation similar to the first gripping cam wherein both gripping cams are independently rotatable relative to the lever about the rotational axis, each cam having an edge surface defining at least a portion of an outwardly radiating spiral relative to the rotational axis and adapted for gripping the under-surface of the tine, and each cam projecting into the socket space toward the interior surface of the first socket wall such that the edge surface of the cam contacts the under-surface of the corresponding tine whenever said tine has been inserted into the socket and the lifting fork has elevated the manbasket off the reference surface, each cam edge also applying a gripping force against the under-surface of the corresponding tine whenever the manbasket is elevated off the reference surface by the lifting fork and said corresponding tine is being urged out of the socket, the gripping force increasing in magnitude as said tine is urged more strongly out of the socket so as to prevent said tine from being removed from the socket;

(d) a spring bias coupled to the lever for applying a pivot force to the lever about the pivot axis sufficient to maintain the edge surface of each cam in contact with the under-surface of the corresponding tine whenever said tine is inserted into the socket and the manbasket is elevated off the reference surface; and (e) a cam-release member having a first end pivotably coupled to the second end of the lever and a second end extending toward the reference surface and terminating with a sole plate adapted to contact the reference surface whenever the manbasket is resting upright on the reference surface but not when the manbasket is elevated off the reference surface, such contact of the cam-release member with the reference surface serving to cause the cam-release member to pivot the lever about the pivot axis sufficiently against the pivot force applied by said spring bias to draw the cam edge surfaces away from gripping contact with the under-surface of the corresponding tine, thereby allowing said tine to be removed from the socket.

13. A method for securing a manbasket to a tine of a lifting fork on a forklift vehicle whenever the lifting fork has elevated the manbasket off a reference surface, where the tine has a lifting surface and an opposing under-surface, and the manbasket has provided thereon a tine socket adapted to receive the tine when the tine is inserted into the socket for the purpose of elevating the manbasket, the method comprising:

automatically engaging a gripping force against the under-surface of the tine whenever the tine is inserted into the socket and the lifting fork has elevated the manbasket off the reference surface, the gripping force allowing the tine to be slipped further into the socket but not slipped out of the socket, and the gripping force automatically increasing in magnitude as the tine is urged more strongly out of the socket so as to prevent the tine from being removed from the socket; and automatically disengaging said gripping force whenever the manbasket is resting upright on the reference surface, thereby allowing the tine to be removed from the socket.

14. A clamp adapted to be mounted to a socket adapted for receiving an elongated lifting member therein for lifting the socket off a reference surface, the lifting member having a lifting surface and an under surface opposite the lifting surface, and the socket defined by socket walls including a first socket wall having an interior surface adapted to contact the lifting surface when the lifting member is in the socket and applying a lifting force to the socket, the clamp comprising:

a lever having an end and a pivot axis, the lever pivotably mounted on said pivot axis to the socket and adapted to pivot relative to the socket so as to allow the end of the lever to be moved toward and away from the first socket wall; and a gripping cam rotatably mounted on a rotational axis to the end of the lever, the cam having an edge surface defining at least a portion of an outwardly radiating spiral relative to the rotational axis, the cam adapted to (a) project into the socket toward the interior surface of the first socket wall such that the edge surface of the cam contacts the under surface of the lifting member when the lifting member is in the socket and the socket is elevated off the reference surface, and (b) rotate about the rotational axis to grippingly engage the under surface of the lifting member and apply a force against the under surface of the lifting member urging the lifting member against the interior surface of the first socket wall when the lifting member is in the socket, the socket is elevated off the reference surface, and the lifting member is being urged out of the socket.

15. A clamp as recited in claim 14 wherein the cam, when the lifting member is in the socket and the socket is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

16. A clamp as recited in claim 14 further comprising a bias coupled to the lever, the bias adapted to apply a pivot force to the lever about the pivot axis relative to the socket sufficient to maintain the edge surface of the cam in contact with the under surface of the lifting member when the lifting member is in the socket and the socket is elevated off the reference surface.

17. A clamp as recited in claim 16 further comprising a cam-release member operably coupled to the lever and adapted to contact the reference surface when the socket is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

18. A clamp as recited in claim 17 wherein the cam-release member comprises a shoe pivotably mounted to the lever and having a sole plate adapted to contact the reference surface when the socket is not elevated off the reference surface.

19. A clamp as recited in claim 14 comprising plural gripping cams each rotatably mounted on a rotational axis to the end of the lever and adapted to (a) project into the socket toward the interior surface of the first socket wall such that the edge surface of the cam contacts the under surface of the lifting member when the lifting member is in the socket and the socket is elevated off the reference surface, and (b) rotate about the rotational axis to grippingly engage the under surface of the lifting member and apply a force against the under surface of the lifting member urging the lifting member against the interior surface of the first socket wall when the lifting member is in the socket, the socket is elevated off the reference surface, and the lifting member is being urged out of the socket.

20. A clamp as recited in claim 14 further comprising:

a bias coupled to the lever, the bias adapted to apply a pivot force to the lever about the pivot axis relative to the socket sufficient to maintain the edge surface of the cam in contact with the under surface of the lifting member when the lifting member is in the socket and the socket is elevated off the reference surface; and a cam-release member operably coupled to the lever and adapted to contact the reference surface when the socket is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

21. A clamp as recited in claim 20 wherein the cam, when the lifting member is in the socket and the socket is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

22. A clamp adapted to grip an elongated lifting member having a lifting surface and an opposing under surface, the clamp comprising:

a socket adapted to receive the lifting member, the socket defined by socket walls including a first socket wall having an interior surface adapted to contact the lifting surface of the lifting member when the lifting member is in the socket and applying an elevating force to the socket;

a lever having an end and a pivot axis, the lever pivotably mounted on said pivot axis to the socket and adapted to pivot relative to the socket so as to allow the end of the lever to be moved toward and away from the first socket wall; and a gripping cam rotatably mounted on a rotational axis to the end of the lever, the cam having an edge surface defining at least a portion of an outwardly radiating spiral relative to the rotational axis, the cam adapted to (a) project into the socket toward the interior surface of the first socket wall such that the edge surface of the cam contacts the under surface of the lifting member when the lifting member is in the socket and the clamp is elevated off a reference surface, and (b) rotate about the rotational axis to grippingly engage the under surface of the lifting member and apply a force against the under surface of the lifting member urging the lifting member against the interior surface of the first socket wall when the lifting member is in the socket, the clamp is elevated off the reference surface, and the lifting member is being urged out of the socket.

23. A clamp as recited in claim 22 wherein the cam, when the lifting member is in the socket and the clamp is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

24. A clamp as recited in claim 22 further comprising a bias coupled to the lever, the bias adapted to apply a pivot force to the lever about the pivot axis relative to the socket sufficient to maintain the edge surface of the cam in contact with the under surface of the lifting member when the lifting member is in the socket and the clamp is elevated off the reference surface.

25. A clamp as recited in claim 24 further comprising a cam-release member operably coupled to the lever and adapted to contact the reference surface when the clamp is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

26. A clamp as recited in claim 25 wherein the cam-release member comprises a shoe pivotably mounted to the lever and having a sole plate adapted to contact the reference surface when the clamp is not elevated off the reference surface.

27. A clamp as recited in claim 22 comprising plural gripping cams each rotatably mounted on a rotational axis to the end of the lever and adapted to (a) project into the socket toward the interior surface of the first socket wall such that the edge surface of the cam contacts the under surface of the lifting member when the lifting member is in the socket and the clamp is elevated off the reference surface, and (b) rotate about the rotational axis to grippingly engage the under surface of the lifting member and apply a force against the under surface of the lifting member urging the lifting member against the interior surface of the first socket wall when the lifting member is in the socket, the clamp is elevated off the reference surface, and the lifting member is being urged out of the socket.

28. A clamp as recited in claim 22 wherein the socket walls include a second socket wall situated opposite the first socket wall, and wherein the lever is pivotably mounted to the second socket wall.

29. A clamp as recited in claim 22 further comprising:

a bias coupled to the lever, the bias adapted to apply a pivot force to the lever about the pivot axis relative to the socket sufficient to maintain the edge surface of the cam in contact with the under surface of the lifting member when the lifting member is in the socket and the clamp is elevated off the reference surface; and a cam-release member operably coupled to the lever and adapted to contact the reference surface when the clamp is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

30. A clamp as recited in claim 29 wherein the cam, when the lifting member is in the socket and the clamp is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

31. A clamp adapted to be rigidly mounted to an implement and to grip an elongated lifting member used to elevate the implement off a reference surface, the lifting member having a lifting surface and an opposing under surface, the clamp comprising:

a socket adapted to receive the lifting member and including mounting means attached to the socket for rigidly mounting the socket to the implement, the socket defined by socket walls including a first socket wall having an interior surface adapted to contact the lifting surface of the lifting member when the lifting member is in the socket and applying a elevating force to the socket;

a lever having an end and a pivot axis, the lever pivotably mounted on said pivot axis to the socket and adapted to pivot relative to the socket so as to allow the end of the lever to be moved toward and away from the first socket wall; and a gripping cam rotatably mounted on a rotational axis to the end of the lever, the cam having an edge surface defining at least a portion of an a outwardly radiating spiral relative to the rotational axis, the cam adapted to (a) project into the socket toward the interior surface of the first socket wall such that the edge surface of the cam contacts the under surface of the lifting member when the lifting member is in the socket and the socket is elevated off a reference surface, and (b) rotate about the rotational axis to grippingly engage the under surface of the lifting member and apply a force against the under surface of the lifting member urging the lifting member against the interior surface of the first socket wall when the lifting member is in the socket, the socket is elevated off the reference surface, and the lifting member is being urged out of the socket.

32. A clamp as recited in claim 31 wherein the cam, when the lifting member is in the socket and the socket is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

33. A clamp as recited in claim 31 further comprising a bias coupled to the lever, the bias adapted to apply a pivot force to the lever about the pivot axis relative to the socket sufficient to maintain the edge surface of the cam in contact with the under surface of the lifting member when the lifting member is in the socket and the socket is elevated off the reference surface.

34. A clamp as recited in claim 33 further comprising a cam-release member operably coupled to the lever and adapted to contact the reference surface when the socket is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

35. A clamp as recited in claim 34 wherein the cam-release member comprises a shoe pivotably mounted to the lever and having a sole plate adapted to contact the reference surface when the socket is not elevated off the reference surface.

36. A clamp as recited in claim 31 comprising plural gripping cams each rotatably mounted on a rotational axis to the end of the lever and adapted to (a) project into the socket toward the interior surface of the first socket wall such that the edge surface of the cam contacts the under surface of the lifting member when the lifting member is in the socket and the socket is elevated off a reference surface, and (b) rotate about the rotational axis to grippingly engage the under surface of the lifting member and apply a force against the under surface of the lifting member urging the lifting member against the interior surface of the first socket wall when the lifting member is in the socket, the socket is elevated off the reference surface, and the lifting member is being urged out of the socket.

37. A clamp as recited in claim 31 wherein the socket walls include a second socket wall situated opposite the first socket wall, and wherein the lever is pivotably mounted to the second socket wall.

38. A clamp as recited in claim 31 further comprising:

bias coupled to the lever, the bias adapted to apply a pivot force to the lever about the pivot axis relative to the socket sufficient to maintain the edge surface of the cam in contact with the under surface of the lifting member when the lifting member is in the socket and the socket is elevated off the reference surface; and a cam-release member operably coupled to the lever and adapted to contact the reference surface when the socket is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

39. A clamp as recited in claim 38 wherein the cam, when the lifting member is in the socket and the socket is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

40. An apparatus for securing an implement to an elongated lifting member when the lifting member has elevated the implement off a reference surface, the lifting member having a lifting surface and an opposing under surface, and the implement including a socket adapted to receive the lifting member for the purpose of elevating the implement, the socket defined by socket walls including a first socket wall having an interior surface adapted to contact the lifting surface of the lifting member when the lifting member is in the socket and applying an elevating force to the implement, the apparatus comprising:

a lever having an end and a pivot axis, the lever pivotably mounted on said pivot axis to the socket and adapted to pivot relative to the socket so as to allow the end of the lever to be moved toward and away from the first socket wall; and a gripping cam rotatably mounted on a rotational axis to the end of the lever, the cam having an edge surface defining at least a portion of an outwardly radiating spiral relative to the rotational axis, the cam adapted to (a) project into the socket toward the interior surface of the first socket wall such that the edge surface of the cam contacts the under surface of the lifting member when the lifting member is in the socket and the implement is elevated off the reference surface, and (b) rotate about the rotational axis to grippingly engage the under surface of the lifting surface and apply a force against the under surface of the lifting member urging the lifting member against the interior surface of the first socket wall when the lifting member is in the socket, the implement is elevated off the reference surface, and the lifting member is being urged out of the socket.

41. An apparatus as recited in claim 40 wherein the cam, when the lifting member is in the socket and the implement is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

42. An apparatus as recited in claim 40 further comprising a bias coupled to the lever, the bias adapted to apply a pivot force to the lever about the pivot axis relative to the socket sufficient to maintain the edge surface of the cam in contact with the under surface of the lifting member when the lifting member is in the socket and the implement is elevated off the reference surface.

43. An apparatus as recited in claim 42 further comprising a cam-release member operably coupled to the lever and adapted to contact the reference surface when the implement is not elevated off the reference surface, such contact of the cam-release member with the reference surface causing the lever to pivot about the pivot axis sufficiently against the pivot force applied by the bias to disengage the cam edge from the under surface of the lifting member, thereby allowing the lifting member to be removed from the socket.

44. An apparatus as recited in claim 43 wherein the cam-release member comprises a shoe pivotably mounted to the lever and having a sole plate adapted to contact the reference surface when the implement is not elevated off the reference surface.

45. An apparatus as recited in claim 40 comprising plural gripping cams each rotatably mounted on a rotational axis to the first end of the lever and adapted to (a) project into the socket toward the interior surface of the first socket wall such that the edge surface of the cam contacts the under surface of the lifting member when the lifting member is in the socket and the implement is elevated off the reference surface, and (b) rotate about the rotational axis to grippingly engage the under surface of the lifting member and apply a force against the under surface of the lifting member urging the lifting member against the interior surface of the first socket wall when the lifting member is in the socket, the implement is elevated off the reference surface, and the lifting member is being urged out of the socket.

46. An apparatus as recited in claim 41 further comprising:

a bias coupled to the lever, the bias adapted to apply a pivot force to the lever about the pivot axis relative to the socket sufficient to maintain the edge surface of the cam in contact with the under surface of the lifting member when the lifting member is in the socket and the implement is elevated off the reference surface; and a cam-release member operably coupled to the lever and adapted to contact the reference surface when the implement is not elevated off the reference surface, such contact of the cam-release member with the reference surface causing the lever to pivot about the pivot axis sufficiently against the pivot force applied by the bias to disengage the cam edge from the under-surface of the lifting member, thereby allowing the lifting member to be removed from the socket.

47. An apparatus as recited in claim 46 wherein the cam, when the lifting member is in the socket and the socket is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

48. An implement adapted to be releasably attached to an elongated lifting member, the lifting member having a lifting surface and an opposing under surface, the implement comprising:

a working portion;

a socket rigidly affixed to the working portion adapted to receive the lifting member, the socket defined by socket walls including a first socket wall having an interior surface adapted to contact the lifting surface when the lifting member is in the socket and applying an elevating force to the implement;

a lever having an end and a pivot axis, the lever pivotably mounted on said pivot axis to the socket and adapted to pivot relative to the socket so as to allow the end of the lever to be moved toward and away from the first socket wall; and a gripping cam rotatably mounted on a rotational axis to the end of the lever, the cam having an edge surface defining at least a portion of an outwardly radiating spiral relative to the rotational axis, the cam adapted to (a) project into the socket toward the interior surface of the first socket wall such that the edge surface of the cam contacts the under-surface of the lifting member when the lifting member is in the socket and the implement is elevated off a reference surface, and (b) rotate about the rotational axis to grippingly engage the under surface of the lifting member and apply a force against said under surface urging the lifting member against the interior surface of the first socket wall when the lifting member is in the socket, the implement is elevated off the reference surface, and the lifting member is being urged out of the socket.

49. An implement as recited in claim 48 wherein the cam, when the lifting member is in the socket and the implement is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

50. An implement as recited in claim 48 further comprising a bias coupled to the lever, the bias adapted to apply a pivot force to the lever about the pivot axis relative to the socket sufficient to maintain the edge surface of the cam in contact with the under-surface of the lifting member when the lifting member is in the socket and the implement is elevated off the reference surface.

51. An implement as recited in claim 50 further comprising a cam-release member operably coupled to the lever and adapted to contact the reference surface when the implement is not elevated off the reference surface, such contact of the cam-release member with the reference surface causing the lever to pivot about the pivot axis sufficiently against the pivot force applied by the bias to disengage the cam edge from the undersurface of the lifting member, thereby allowing the lifting member to be removed from the socket.

52. An implement as recited in claim 48 further comprising plural gripping cams each rotatably mounted on a rotational axis to the first end of the lever and adapted to (a) project into the socket toward the interior surface of the first socket wall such that the edge surface of the cam contacts the under-surface of the lifting member when the lifting member is in the socket and the implement is elevated off the reference surface, and (b) rotate about the rotational axis to grippingly engage the under surface of the lifting member and apply a force against the under surface of the lifting member urging the lifting member against the interior surface of the first socket wall when the lifting member is in the socket, the implement is elevated off the reference surface, and the lifting member is being urged out of the socket.

53. An apparatus as recited in claim 48 further comprising:

a bias coupled to the lever, the bias adapted to apply a pivot force to the lever about the pivot axis relative to the socket sufficient to maintain the edge surface of the cam in contact with the under surface of the lifting member when the lifting member is in the socket and the implement is elevated off the reference surface; and a cam-release member operably coupled to the lever and adapted to contact the reference surface when the implement is not elevated off the reference surface, such contact of the cam-release member with the reference surface causing the lever to pivot about the pivot axis sufficiently against the pivot force applied by the bias to disengage the cam edge from the under-surface of the lifting member, thereby allowing the lifting member to be removed from the socket.

54. An implement as recited in claim 53 wherein the cam, when the lifting member is in the socket and the implement is elevated off the reference surface, is adapted to more strongly grip the under surface of the lifting member and increase the magnitude of said force against the under surface of the lifting member when the lifting member is being urged more strongly out of the socket so as to prevent the lifting member from being removed from the socket.

* * * * *